United States Patent [19]

Kirma

[11] Patent Number: 5,267,337
[45] Date of Patent: Nov. 30, 1993

[54] COMBINED CONNECTOR FOR COUPLING ELECTRICAL CONDUCTORS AND OPTICAL CONDUCTORS RESPECTIVELY

[75] Inventor: Safa Kirma, Wedel/Holstein, Fed. Rep. of Germany

[73] Assignee: Deutsche Aerospace Airbus GmbH, Hamburg, Fed. Rep. of Germany

[21] Appl. No.: 891,785

[22] Filed: Jun. 1, 1992

[30] Foreign Application Priority Data

Jun. 3, 1991 [DE] Fed. Rep. of Germany ....... 4118096

[51] Int. Cl.$^5$ .............................................. G02B 6/38
[52] U.S. Cl. ........................................ 385/75; 385/60; 385/78
[58] Field of Search .................. 385/75, 59, 60, 78, 385/71, 101

[56] References Cited

U.S. PATENT DOCUMENTS

| | | | |
|---|---|---|---|
| 4,081,208 | 3/1978 | Meade | 385/75 |
| 4,666,242 | 5/1987 | Cairns | 385/75 |
| 4,767,181 | 8/1988 | McEowen | 385/75 X |
| 4,775,212 | 10/1988 | Smith | 385/101 |
| 4,896,939 | 1/1990 | O'Brien | 385/101 |
| 5,125,056 | 6/1992 | Hughes et al. | 385/75 X |

*Primary Examiner*—John D. Lee
*Assistant Examiner*—Phan T. Heartney
*Attorney, Agent, or Firm*—W. G. Fasse

[57] ABSTRACT

Electrical and optical couplings are provided in a common housing for electrically and optically interconnecting respective cable ends. Such cables have a central optical conductor surrounded by an electrical conductor, preferably a wire mesh conductor. The coupling components cooperate with each other for providing a secure electrical connection and a precise optical coupling, while simultaneously protecting the optical conductor against damage and against excessive bending. The electrical connection and the optical coupling are separate and do not interfere with each other.

17 Claims, 4 Drawing Sheets

COMBINED CONNECTOR FOR COUPLING ELECTRICAL CONDUCTORS AND OPTICAL CONDUCTORS RESPECTIVELY

CROSS-REFERENCE TO RELATED APPLICATION

The present invention relates to U.S. Ser. No. 07/891,782 filed: Jun. 1, 1992, by inventor: Safa Kirma, and entitled: CABLE CONSTRUCTION WITH A LIGHT CONDUCTOR AND AN ELECTRICAL CONDUCTOR.

FIELD OF THE INVENTION

The invention relates to a combined connector for coupling an electrical conductor with another electrical conductor and for also coupling an optical conductor with another optical conductor in the same housing for electrical and light conductor cables.

BACKGROUND INFORMATION

Plug-in type connectors are known which permit connecting electrical conductors, or a plurality of electrical conductors, with respective other electrical conductors through an electrically conducting coupling. Further, it is known to connect optical conductors with each other to provide a light transmission from one optical conductor to another optical conductor. However, there is a problem in providing a sufficient mechanical stability and protection for the conductors, especially when using optical conductors, such as glass fiber cables. More specifically, it is difficult to protect these optical conductors inside the connector. Such protection must be assured, especially when the connectors are used for equipment that is subject to security requirements, such as computers, one-way and two-way communication equipment, devices in the aircraft technology, and in computer controlled machinery. In connection with optical conductors it has been found that even small tension loads to which the optical conductor may be exposed lead, if the exposure is prolonged, to micro-cracks which are likely to cause a complete break of the optical fiber conductor in due course.

Optical fibers have a bending angle which relates to a limit angle that assures a total reflection of light impinging on the optical conductor. If a bend in the optical conductor exceeds the limit angle, light will exit from the light conductor sidewalls, rather than at its end. Light exiting through the side walls of the optical conductor is lost and leads to a reduction in the transmitted light which reduces the light intensity and thus increases the damping. The above mentioned tension loads should be avoided, since they tend to damage the light conductor. However, the bending of the light conductor and the resulting bending stress, as well as torsion loads, causing torsion stress, are also disadvantageous and must be avoided as much as possible.

In spite of the above mechanical problems, optical conductors have rapidly found wide-spread acceptance in data transmissions due to the high data transmission rates of which optical conductors are capable for many uses or purposes. By combining at least one optical conductor with at least one electrical conductor, it has become possible to provide a special cable construction which, to some extent, avoids the above disadvantages of the use of optical conductors by protecting the optical conductor with the electrical conductor which encloses the optical conductor substantially coaxially. However, coupling devices for interconnecting sections of such cables are not available for providing a simple, yet reliable connection between such cable sections.

OBJECTS OF THE INVENTION

In view of the foregoing it is the aim of the invention to achieve the following objects singly or in combination:

to provide a combined connector for coupling the electrical conductors with each other and the optical conductors with each other where such conductors are part of the same cables that need to be connected to each other;

to provide a reliable mechanically stable connection between optical conductors and between electrical conductors separately, yet in the same connector to assure the required stability for each of the conductors; and to protect the optical conductor that is surrounded by an electrical conductor also in the connector or coupling device itself.

SUMMARY OF THE INVENTION

A combined connector according to the invention is characterized in that a connector housing includes an optical coupling for connecting the optical conductor ends to each other and an electrical coupling for connecting the electrical conductor ends to each other.

The combination of an optical coupling with an electrical coupling in a common housing makes it possible to use the electrical conductor for stabilizing the optical conductor. Such optical conductors are made especially of glass fibers or synthetic material fibers. The increased stability of the optical fibers is provided by the fact that the electrical conductor surrounds the optical conductor at least partly. The electrical coupling is constructed for connecting electrical conductors formed as a metal webbing which permits to interconnect flexible cables with each other while still assuming the high stability of the optical conductor by protecting the optical conductor against excessive bending. Further, combining the optical coupling with the electrical coupling results in a compact structure that is especially suitable for use in aeronautic and space technology applications. and is easily accessible due to its small size.

The present connector achieves a substantial compactness by its feature that the electrical coupling and the optical coupling extend coaxially and/or concentrically relative to each other at least over portions of the connector. A particular good protection of the optical components including the optical conductor against mechanical loads is achieved by a concentric arrangement of the optical coupling within the electrical coupling at least over a certain length of the connector.

By constructing the coupling components as male and female plug elements of electrically conducting material, a simple handling of the connector is assured, especially where one housing section is secured to the other housing section by a snap-interlock.

The present connector also assures the desired mechanical stability simultaneously with a sufficient flexibility by using an electrical conductor of a metal webbing that is received or rather wedged into a plug-in connector element. For this purpose a wedging sleeve or support sleeve is arranged in an opening of the respective connector element facing toward the cable end. Preferably, the wedging sleeve or support sleeve is axially displaceable in the respective opening of the connector element.

The construction of the electrical coupling as male and female plug elements permits arranging the optical conductor to pass coaxially through the male and female coupling elements, whereby the optical conductor is effectively protected.

In another embodiment the use of standardized male and female plug-in elements permits arranging these elements in axial alignment with each other, whereby two plug-in elements are received in a coupling sleeve and the optical conductor still passes concentrically through the coupling structure.

Where the ends of two cables can be coupled so that the incoming cable and the outgoing cable can extend in parallel to each other, it is possible to achieve an especially compact arrangement by providing each cable with a male plug-in connector and these plug-in connectors are received in respective sleeves arranged in parallel to each other in a common housing. In this embodiment the optical coupling is arranged as a prism at the end of the two parallel optical conductor ends while the electrical connection is achieved through the electrically connected coupling sleeves.

The coupling sleeves are preferably secured against axial withdrawal, for example, by a ring bearing against a component of the female portion of the coupling in the connector housing.

The present connector housing is preferably equipped with a section that is suitable for attachment to a mounting rail which is conventionally used for securing such connectors in aircraft and spacecraft or the like. Such a construction permits a rapid performance of mounting operations, as well as maintenance operations, while still maintaining a small volume of the connector.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
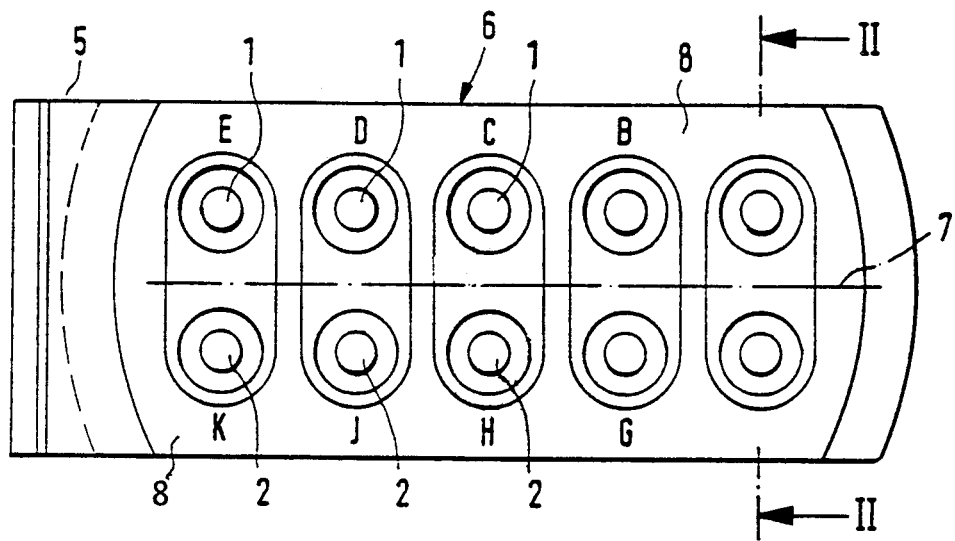
FIG. 1 is a plan view in the direction of the arrow A in FIG. 2 onto a first connector embodiment according to the invention for coupling a plurality of incoming cables, in pairs, with a respective plurality of outgoing cables extending alongside one another.
Figure 2:
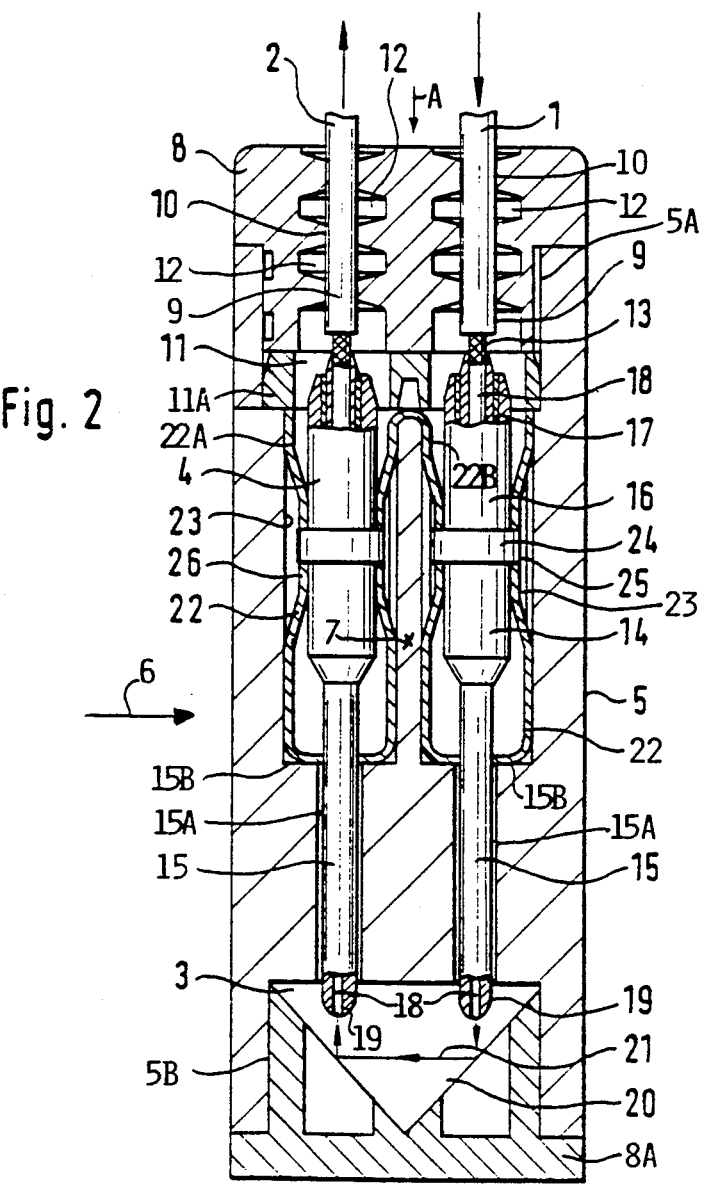
FIG. 2 is a sectional view along section line II—II in FIG. 1.

FIGS. 1 and 2 illustrate a first embodiment of a coupling connector according to the invention. A plurality of incoming cables 1 are to be coupled to a plurality of outgoing cables 2. The incoming and outgoing cables may extend approximately alongside one another. Each cable comprises an optical conductor 18 surrounded by an electrical conductor 13 in the form of a wire mesh which in turn is surrounded by electrical insulating. A total of 10 cables are to be interconnected in five pairs A-F, B-G, C-H, D-J, and E-K. An optical coupling 3 and an electrical coupling 4 are arranged in a common housing 5. A connector modular unit 6 is formed in the common housing 5 which has a longitudinal housing axis 7 that extends perpendicularly to the drawing sheet in FIG. 2.

The housing 5 has a first socket bore 5A at its top end, as shown in FIG. 2, and a second socket bore 5B at its bottom end. A housing cover 8 is received, for example with a press fit, in the socket bore 5A. A further housing cover 8A is received, for example, with a press fit, in the socket bore 5B. The first housing cover 8 is provided with bores 10 in which the cables 1 and 2 are received, including the insulator jacket 9 of each cable 1 and 2. The insulator jacket 9 of each cable passes through the bore 10 into a space 11 formed inside the housing 5 and surrounded by a holding ring 11A to be described in more detail below. The bores 10 are surrounded along their length by increased diameter chambers 12 which assure a sufficient elasticity of the housing cover 8 so that the latter is received with an elastic press fit in the socket bore 5A and so that the cables 1 and 2 are also elastically gripped by the housing cover 8. The insulator jacket 9 is stripped from the wire mesh electrical conductors 13 for electrically connecting the conductors 13 to the electrical coupling 4 including an electrically conducting male plug. For this purpose the wire mesh electrical conductor 13 bared of its insulation 9, is pushed back, whereby its diameter widens. A support sleeve 17 is then threaded onto the free end of the optical conductor 18 and the electrical wire mesh conductor 13 is then peeled back onto the support sleeve 17. The electrical coupling 4 is then pushed onto the conductor wire mesh 13 as it is supported by the sleeve 17, whereby the wire mesh conductor 13 is securely wedged between the sleeve 17 and the electrical coupling 4, thereby simultaneously establishing an electrical connection between the wire mesh conductor 13 and the coupling 4. Each coupling 4 is constructed as a coupling cylinder 16 in which the support sleeve 17 is received to provide the above described electrical connection between the wire mesh electrical conductor 13 and the coupling cylinder 16. The optical conductor 18 passes concentrically through the coupling cylinder 16. The lower end 14 of the coupling cylinder 16 merges into a male plug pin 15 through which the respective optical conductor 18 extends all the way to the open rounded end 19 so that the flat end surface of the optical conductor 18 is exposed at the rounded end 19. Each plug pin 15 passes through a respective bore 15A in the housing 5. Each coupling cylinder 16 is held against axial displacement in the housing 5. For this purpose, each cylinder 16 has a collar 24 cooperating with bushings 22 and 22A received in bores 23 of the housing extending coaxially with the respective bores 10 and 15A. The bushings 22, 22A form electrically conducting female coupling sockets. Displacement axially downwardly is prevented because the collar 24 rests against a shoulder 25 in an inwardly bent portion 26 of the bushings 22. The bushings 22 in turn rest against a shoulder 15B in the housing 5. Axial displacement upwardly is prevented because the collars 24 rest against respective shoulders of the bushing 22A. The bushing 22A in turn is held in place since it rests axially against the insert ring 11A that is held in place by the housing cover 8. The electrical connection through the electrical coupling 4 is established by an intermediate contact member 22B that bears with a resilient spring force against the coupling cylinders 16 and against the collars 24 of these cylinders 16. These cylinders 16 in turn are electrically connected to the conductors 13 through the support sleeves 17 as described above. Thus, the right-hand coupling is connected electrically to the left-hand coupling and vice versa in FIGS. 1 and 2.

The optical coupling 3 is a prism 20 held in the bottom cover 8A in such a position that a light path 21 is established from one light conductor end to the other through the prism 20 as shown at the bottom of FIG. 2. The prism 21 is preferably an Amici-prism, the sides of which are totally reflecting to form the light coupling path 21 for the optical coupling 3. The ends 19 of the plug pins 15 are rounded and partially received within the confines of the prism 20.

As best seen in FIG. 2, in the first embodiment, the incoming and outgoing cables 1 and 2 and the respective coupling devices extend alongside each other. Contrary thereto, FIGS. 3, 4, and 5 show an embodiment in which the conductors extend coaxially, that is, in axial alignment with each other in the connector housing.

Figure 3:
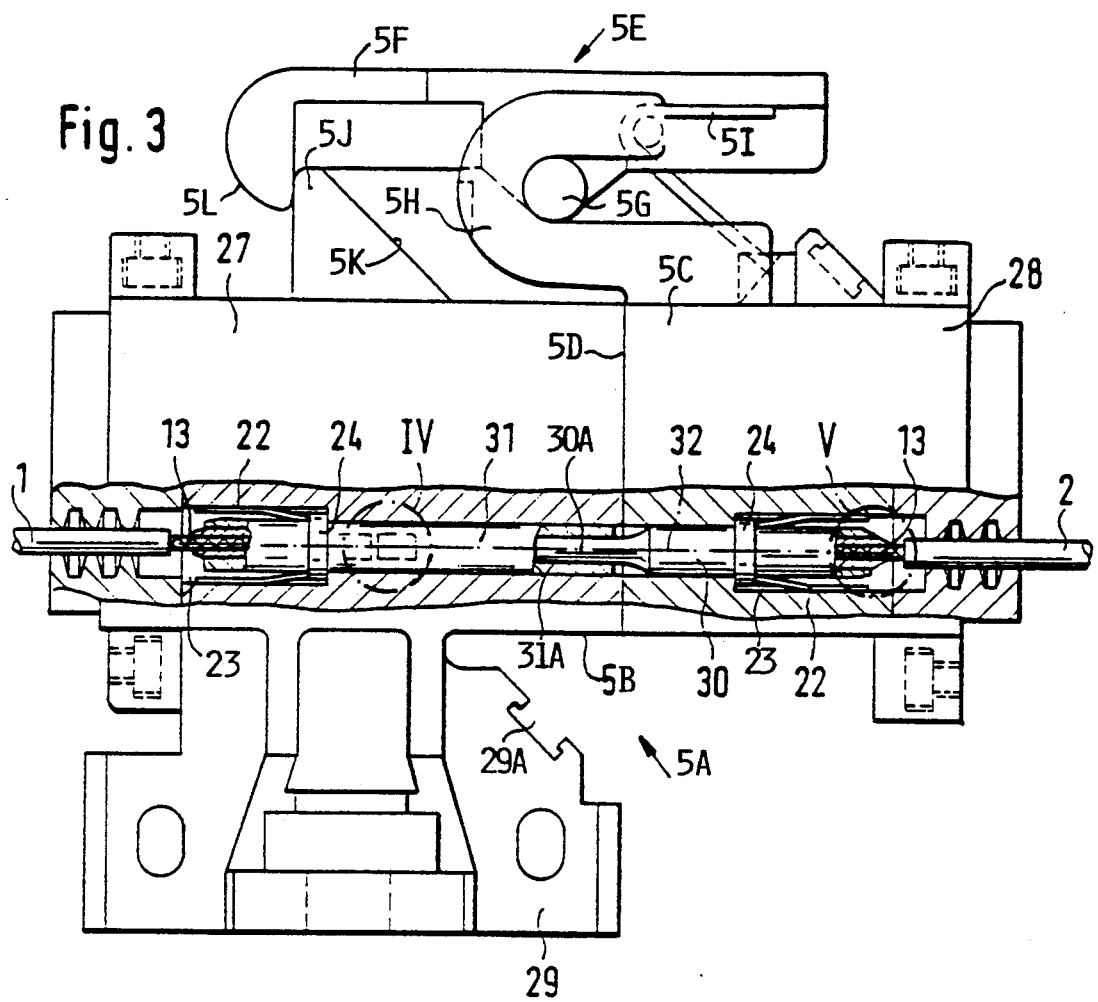
FIG. 3 shows a side view, partially in section, of a second connector embodiment according to the invention in which the incoming conductor cable and the outgoing conductor cable are axially aligned with each other, and wherein plug-in elements are used for the coupling.

Referring to FIG. 3, a connector housing 5A comprises two sections 5B and 5C separable along an interface 5D. The housing section 5C is locked to the housing section 5B by a locking mechanism 5E. The locking mechanism comprises a hook 5F journalled to the housing 5C by a journal shaft 5G supported by a support bail 5H which in turn is secured to and forms part of the housing section 5C. A spring 5I biases the hook 5F into the shown locking position in which the hook 5F engages a latch member 5J rigidly secured to or forming part of the housing section 5B. The latch member 5J has a ramp surface 5K which permits the outer surface 5L of the hook 5F to ride up against the bias of the spring 5I prior to snapping into the shown locking position. Thus, when the two housing sections 5B and 5C are brought together so that the surfaces contact each other at 5D, the hook 5F with its surface 5L will run up on the ramp 5K until the interlocking position is reached. The release of the housing section 5C from the housing section 5B is easily accomplished by pushing the right-hand end of the hook 5F downwardly against the bias of the spring 5I and pulling the housing section 5C with its bail and hook axially to the right.

The housing section 5B is provided with mounting elements 27 and 29. The housing section 5C is provided with a mounting element 28. The mounting element 29 has a T-groove 29A for engaging a respective mounting rail not shown. The conductor cable 1 is introduced into the housing section 5B while the conductor cable 2 is introduced into the housing section 5C in coaxial alignment with the conductor cable 1. Each housing section has a bore 23 for receiving a bushing 22 of electrically conducting material to form part of the electrical coupling to be described below. The electrical coupling comprises a male plug member 30 connected to the electrical conductor 13 of the cable 2. The coupling further comprises a female plug member 31 connected to the electrical conductor 13 of the cable 1. These electrical connections are accomplished in the same manner as described above. The female plug member 31 and the male plug member 30 extend coaxially relative to the longitudinal contact axis or coupling axis 32 as best seen in FIG. 3. The male plug member 30 has a plug extension or contact pin 30A that extends coaxially into the female plug member 31 at least partly along the axial direction to establish the electrical connection. Each of the plug members 30 and 31 is provided with a collar 24 with spring legs that form the bushing 22, whereby the spring legs bear against the inner surface of the respective bore 23 to secure the plug member in the respective housing section.

Figure 4:
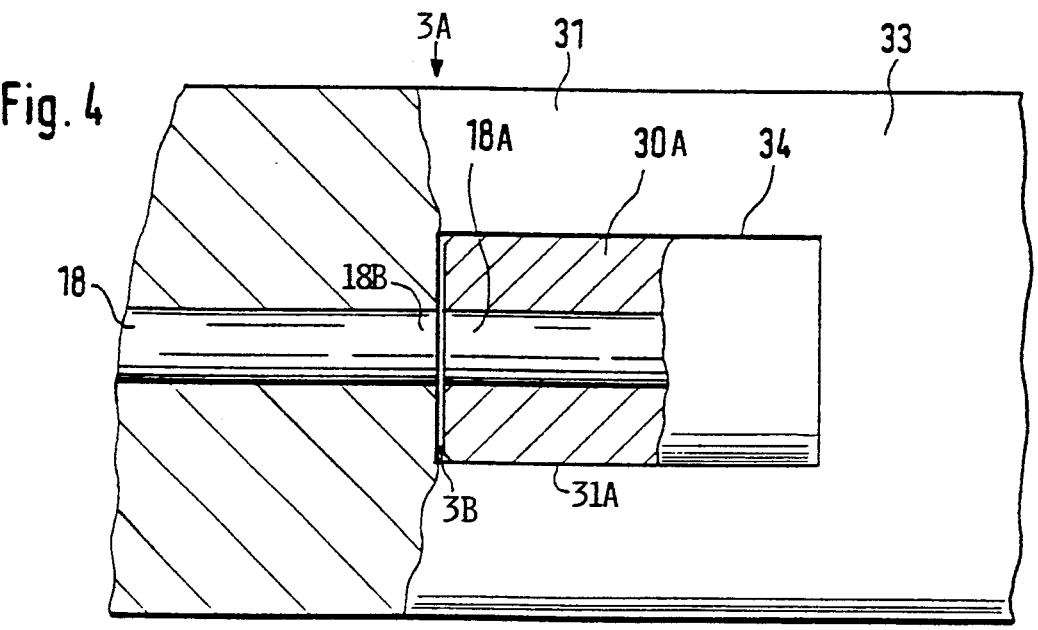
FIG. 4 shows, on an enlarged scale, the detail IV of FIG. 3 showing the optical coupling between the facing ends of the incoming and outgoing optical conductors.
Figure 5:
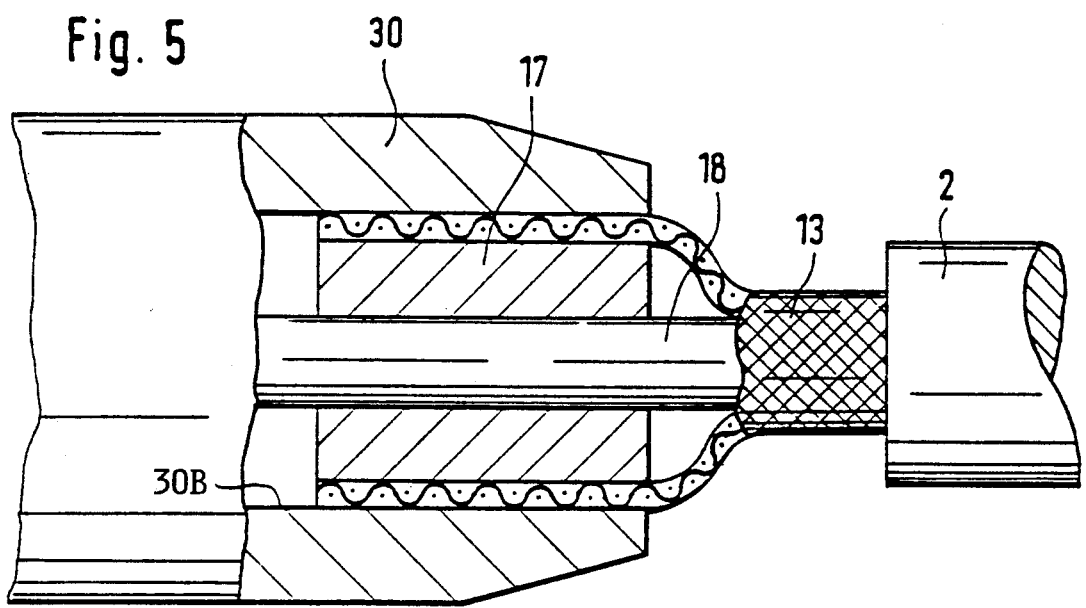
FIG. 5 shows on an enlarged scale, the detail V in FIG. 3 for illustrating the electrical connection of the electrical conductor to a male plug-in element and also showing a snap-interlock.

FIG. 4 shows the detail 4 of FIG. 3, thereby illustrating the optical coupling 3A where the ends 18A and 18B of the respective optical conductors 18 face each other across a narrow gap 3B. The pin end 30A of the male plug member 30 reaches into the bore 31A of the female plug member sufficiently so that the optical conductor ends 18A and 18B can face each other as shown. An electrically conducting contact sleeve portion 33 of the female plug member 31 is provided with a window 34 which permits cutting and properly aligning the end 18A of the optical conductor even after the insertion of the male plug pin 30A into the bore 31A of the female plug member 31.

FIG. 5 shows the connection of the electrical wire mesh conductor 13 of the cable 2 to the male plug-in member 30. Similarly as in FIGS. 1 and 2, a support sleeve 17 surrounds the optical conductor 18. The free end of the wire mesh conductor 13 is first pushed back to widen its diameter and then the sleeve 17 is inserted into the wire mesh conductor 13. Thereafter, the male plug 30 is pushed with its bore 30B onto the conductor 13 which is thus wedged in place between the male plug member 30 and the support sleeve 17 to provide the required electrical connection. The optical conductor 18 passes through the sleeve 17 which thus provides a proper support and protection for the optical conductor 18.

Figure 6:
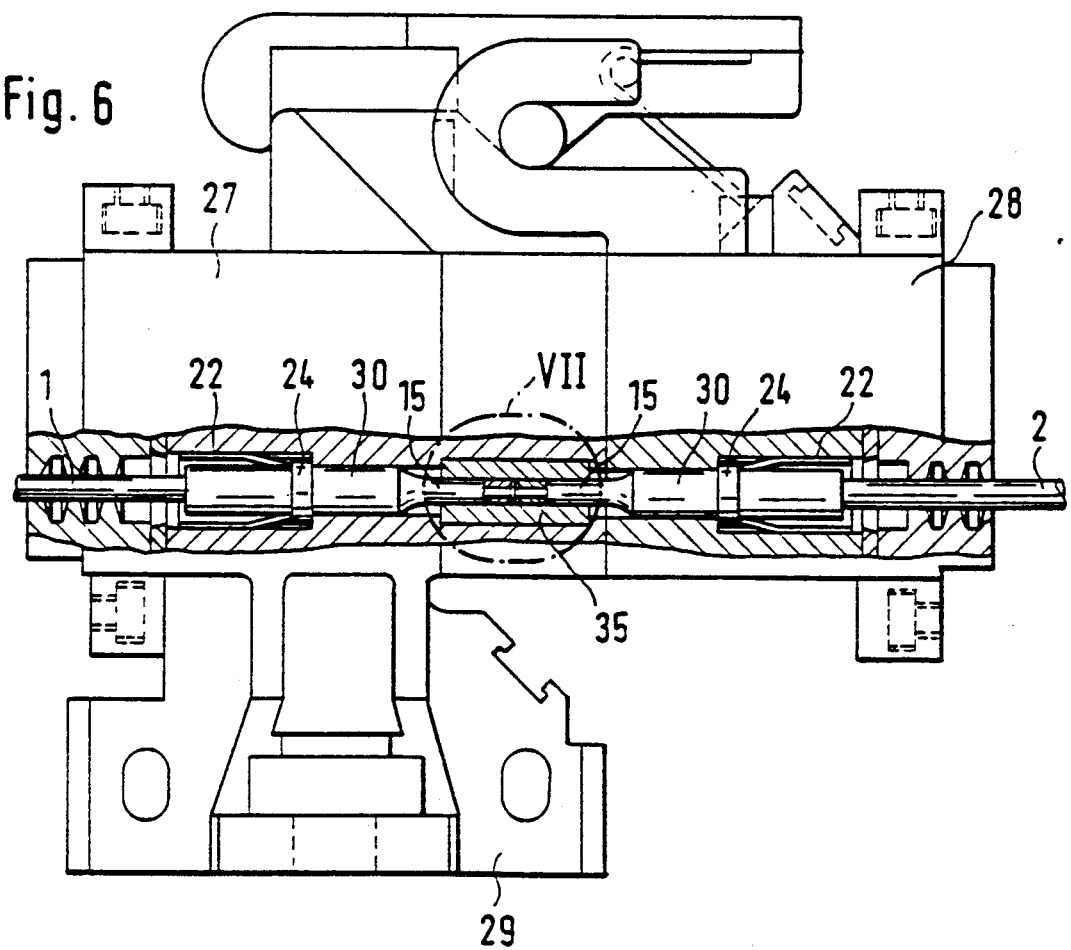
FIG. 6 is a side view, partially in section, similar to FIG. 3, however showing a further embodiment of the present connector couplings, wherein an electrically conducting coupling sleeve surrounds the optical coupling in which the optical conductor ends face each other axially.
Figure 7:
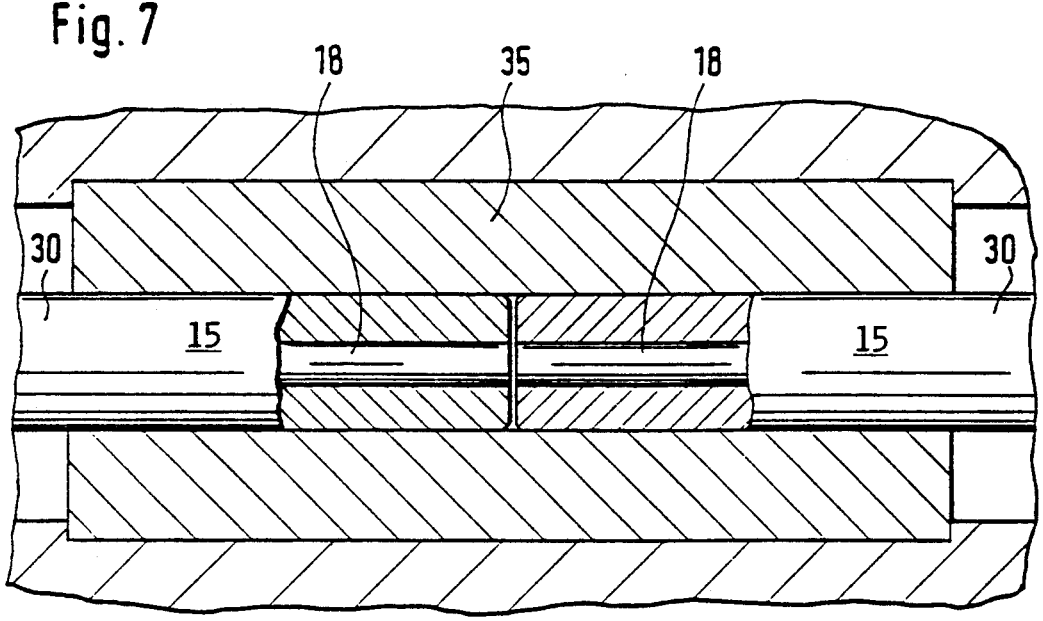
FIG. 7 shows, on an enlarged scale, the detail VII in FIG. 6.

FIG. 6 shows a view similar to that of FIG. 3, however with a somewhat different connection. The components which are the same in FIGS. 3 and 6 will not again be described, to avoid repetition. In FIG. 6 two male plugs 30 are used in coaxial alignment and these two male plugs are electrically interconnected by a connector bushing 35 inside of which the optical coupling takes place. Thus, the electrical coupling and the optical coupling are accomplished by and in the electrically conducting bushing 35. Each of the male plug members 30 has a reduced diameter pin section 15 through which the respective optical conductor 18 extends as shown in FIG. 7. These plug-in pin sections 15 fit snuggly into the electrically conducting bushing 35 to provide the electrical connection. The two ends of the optical conductors face each other across a very narrow gap, whereby the transfer of the optical signals from one optical conductor to the other takes place with a minimum of losses.

Figure 8:
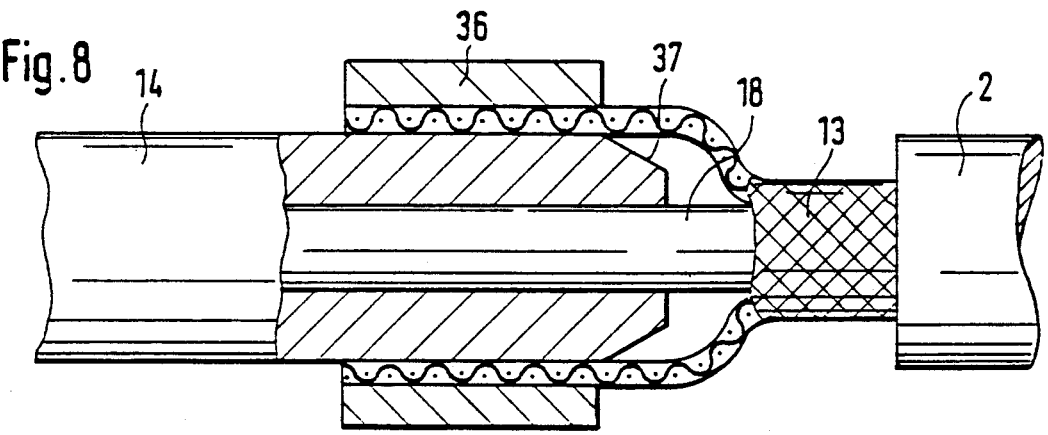
FIG. 8 shows, on an enlarged scale, a view similar to that of FIG. 5, but illustrating a modified electrical coupling.

FIG. 8 shows a male plug pin 14 that has an inner bore for supporting the optical conductor 18. The wire mesh of the electrical conductor 13 is first peeled back to widen its diameter and then pushed onto the outer surface of the plug pin 14. A clamping bushing 36 then surrounds the wire mesh of the conductor 13. Preferably, the forward free end of the plug pin 14 is provided with a taper 37 to facilitate the insertion of the free end of the plug pin 14 into the wire mesh of the conductor 13.

Figure 9:
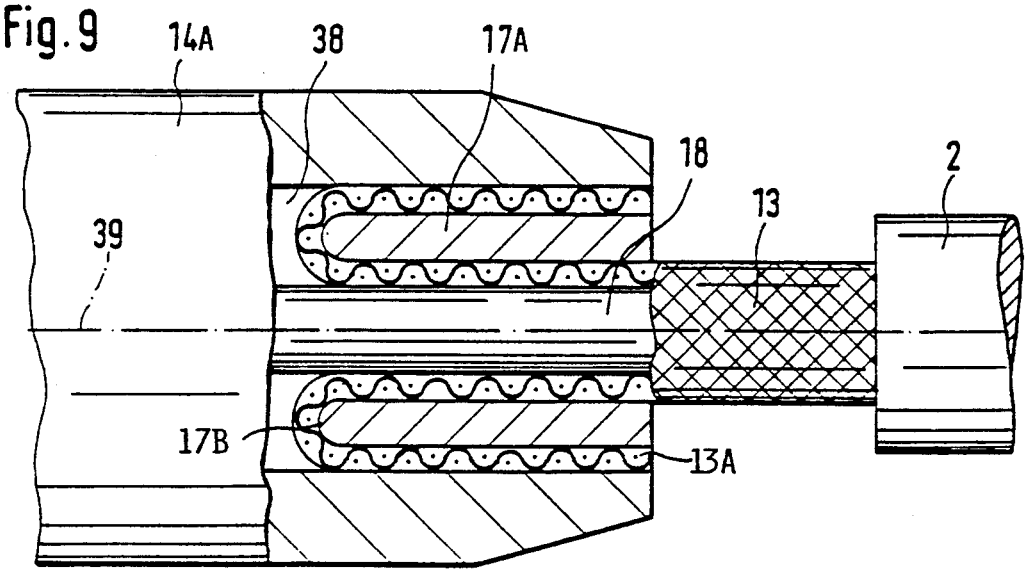
FIG. 9 shows, on an enlarged scale, partially in section, a further electrical coupling embodiment according to the invention.

FIG. 9 shows still another electrical coupling in which the male plug pin 14A is provided with a concentric bore 38 at its free end extending coaxially with the longitudinal plug axis 39. A support sleeve 17A has an axial bore with a diameter fitting onto the outer diameter of the electrical conductor 13. The sleeve 17A further has an outer diameter so that the free end of the conductor 13 can be folded back as shown at 13A onto the sleeve 17A which is then inserted into the bore 38 of the male plug 14A. The dimensions of the sleeve 17 are so selected that a tight fit of the electrical conductor inside the recess 38 is assured and that simultaneously the optical conductor 18 is protected inside the sleeve 17A. The inwardly facing edge or end of the sleeve 17A is rounded at 17B to protect the back folded portion 13A of the conductor 13.

The coupling members, such as the male plug members 30, the female plug member 31, and all other components of the couplings are preferably so dimensioned that their insertion into standardized housing chambers is possible.

Referring again to FIG. 4, the optical conductor ends 18A and 18B should be precisely aligned with each other in the axial direction. For this purpose, the respective plug members are provided with precision bores in which the optical conductor ends are precisely received. Additionally, the ends of the optical conductors should first slightly project out of the respective plug member so that a precise cut can be made of the optical conductor ends, for example, through the window 34. Additionally, the precisely cut ends of the optical conductor could be machined or worked to achieve the desired surface structure of the facing ends of the optical conductors. These operations can be performed through the window 34 prior to a complete insertion of the plug-in pin 30A into the precision bore 31A.

Although the invention has been described with reference to specific example embodiments, it will be appreciated that it is intended to cover all modifications and equivalents within the scope of the appended claims.

What I claim is:

1. A combined connector for connecting two cables each forming at least two separate transmission channels, each cable comprising an optical conductor forming one transmission channel and an electrical conductor forming another transmission channel concentrically surrounding said optical conductor, comprising electrical first coupling means for electrically interconnecting said electrical conductors of both cables with each other, optical second coupling means for optically coupling said optical conductors of both cables with each other, connector housing means for holding said first coupling means and said second coupling means together in said connector housing means, said first electrical coupling means comprising two electrically conducting male plugs, one for each cable, and female electrically conducting socket bushing means for receiving said male plugs concentrically therein, and wherein each of said optical conductors is led coaxially through a respective male plug and concentrically through said female socket bushing means, said housing means comprising a recess wherein said socket bushing means is received in a fixed position in said housing means, said male plug extending into said socket bushing means for establishing an electrical connection between said electrical conductors of both cables, said optical coupling means comprising means for holding said optical conductors in a fixed position relative to each other for an optical coupling of both optical conductors of both said cables to each other, and wherein said two male plugs are arranged in axial alignment with each other in the direction of a longitudinal connector axis, said female socket bushing means comprising an electrically conducting female connector sleeve for electrically interconnecting said axially aligned male plugs in series with each other.

2. The combined connector of claim 1, wherein said electrical first coupling means extend at least partially coaxially to said optical second coupling means.

3. The combined connector of claim 1, wherein said electrical first coupling means and said optical second coupling means extend at least partially concentrically to each other so that said electrical first coupling means surround at least partly said optical second coupling means.

4. The combined connector of claim 1, wherein said first electrical coupling means comprise pin plugs constructed of an electrically conducting material, said optical conductors extending coaxially through said pin plugs.

5. The combined connector of claim 1, wherein said electrical conductor of each cable is a metal webbing conductor, said male plug of said electrical first coupling means comprising a plug connector having a wall area connected to said metal webbing electrical conductor.

6. The combined connector of claim 5, wherein said plug connector comprises a support sleeve extending toward a respective cable, said support sleeve clamping said metal webbing electrical conductor against said plug connector.

7. The combined connector of claim 6, wherein said support sleeve is mounted in said plug connector for a longitudinal displacement relative to said plug connector for clamping said metal webbing between said sleeve and said plug connector.

8. The combined connector of claim 1, wherein said housing means comprises means with a configuration for engagement by a mounting rail.

9. The combined connector of claim 1, wherein said housing means comprise two sections and locking means for interlocking said two housing sections.

10. The combined connector of claim 1, further comprising spring means in said locking means for releasably interconnecting said two housing sections.

11. A combined connector for connecting two cables forming at least two separate transmission channels with each other, each cable comprising an optical conductor forming one transmission channel and an electrical conductor forming another transmission channel concentrically surrounding said optical conductor, comprising electrical first coupling means for electrically interconnecting said electrical conductors of both cables with each other, optical second coupling means for optically coupling said optical conductors of both cables with each other, connector housing means for holding said first coupling means and said second coupling means together in said connector housing means, said first electrical coupling means comprising two electrically conducting male plugs, one for each cable, and two female electrically conducting socket bushings constructed to receive said male plugs concentrically therein, said male plugs and female sockets forming two pairs, each pair including one female socket bushing and one male plug received in its female socket bushing, and wherein each of said optical conductors is led coaxially through a respective male plug and concentrically through the respective female socket bushing, said housing means comprising a housing recess, said female socket bushings being received in a fixed parallel position in said housing recess, and means in said housing recess for electrically connecting said female socket bushings to each other for electrically connecting said electrical conductors in series with each other, said optical coupling means comprising means for holding said male plugs and said optical conductors in a fixed position relative to each other for an optical coupling of both optical conductors of said cables to each other.

12. The combined connector of claim 11, wherein said optical second coupling means further comprises a prism which forms a light conductor path for optically interconnecting open ends of said optical conductors extending concentrically through said male plugs and concentrically through said female socket bushings, and wherein each of said male plugs has a plug pin extending coaxially out of its female socket bushing, so that two plug pins extend in parallel to each other toward said prism for optically coupling two respective parallel optical conductors to each other through said prism mounted to said housing.

13. The combined connector of claim 12, wherein said prism is an Amici-prism.

14. The combined connector of claim 11, wherein said means for holding said male plugs further comprise a safety device arranged in said housing means for securing said first and second coupling means against an axial displacement, said safety device comprising an increased dimension portion on said male plugs, said increased dimension portion being taken up by respective recesses for fixing said male plugs and said female socket bushings in a defined position relative to each other in said housing means.

15. The combined connector of claim 11, wherein said housing means comprises means with a configuration for engagement by a mounting rail.

16. The combined connector of claim 11, wherein said housing means comprise two sections and locking means for interlocking said two housing sections.

17. The combined connector of claim 11, further comprising spring means in said locking means for releasably interconnecting said two housing sections.

* * * * *